United States Patent [19]

Hornagold et al.

[11] 4,079,807
[45] Mar. 21, 1978

[54] STEERING MECHANISM

[75] Inventors: John T. Hornagold, Arden Hills; Gary H. Beckley, Roseville; Ram N. Rathi, New Brighton, all of Minn.

[73] Assignee: American Hoist & Derrick Company, St. Paul, Minn.

[21] Appl. No.: 686,058

[22] Filed: May 13, 1976

[51] Int. Cl.² .............................................. B62D 7/00
[52] U.S. Cl. ................................. 180/145; 280/95 R
[58] Field of Search ............... 180/140, 145, 150, 152, 180/153, 79.3, DIG. 2; 280/95 R, 638

[56] References Cited

U.S. PATENT DOCUMENTS

| | | | |
|---|---|---|---|
| 3,202,238 | 8/1965 | Strader | 180/140 |
| 3,495,674 | 2/1970 | Askins | 180/140 |
| 3,527,316 | 9/1970 | Joner | 180/160 |
| 3,782,491 | 1/1974 | Herbenar | 180/DIG. 2 |

Primary Examiner—Joseph F. Peters, Jr.
Assistant Examiner—R. Schrecengost
Attorney, Agent, or Firm—Burd, Braddock & Bartz

[57] ABSTRACT

A steering mechanism particularly suited for vehicles of the type having a variable width track. The steering mechanism is flexible enabling it to automatically extend and retract laterally along with the track of the wheels of the vehicle. The mechanism acts on steering arms of the steerable wheels of a vehicle to simulate a conventional tie rod type of steering geometry. During turning, the inner wheel turns more than the outer wheel to minimize tire slippage or scrub. A flexible steering linkage assembly is connected between the steering arm ends of the pair of steerable wheels to maintain controlled spatial relationship between them which results in a simulation of tie rod steering geometry.

21 Claims, 4 Drawing Figures

STEERING MECHANISM

BACKGROUND OF THE INVENTION

Certain steerable, wheeled work vehicles, such as truck cranes, are advantageously equipped with a variable width track. That is, one or more of the steerable wheels are extendible and retractable relative to the vehicle body. Extension of the wheels enhances the stability of the vehicle beyond normal traveling configuration with the wheels laterally retracted. Conventional types of steering mechanisms are not readily adaptable to these variable track width vehicles.

When a typical steerable, wheeled vehicle executes a turn, the radius of travel of the inside wheel on the turn is shorter than that of the outside wheel. To achieve an optimum rolling action of the wheels and avoid tire slippage, the rolling axis of the inner wheel must be at a sharper angle with the vehicle frame than the outer wheel. According to well-known Ackermann goemetry, on a vehicle with front wheel steering, optimum rolling action during a turn occurs when the axes of the front wheels intersect at a point on an extension of the rear wheel axis.

On a conventional, fixed track vehicle, optimum steering geometry is acceptably approximated by a tie rod assembly. However, tie rods are fixed length links which must be physically removed and replaced to achieve such geometry at a changed track width.

SUMMARY OF THE INVENTION

The invention relates to a steering mechanism with a steering linkage for pairs of wheels of vehicles having variable width tracks. Each steering linkage is flexible to permit extension and retraction thereof along with the wheels of the vehicle. Ends of each linkage are connected to the ends of a pair of steering arms of corresponding steerable wheels on the vehicle. Each linkage is centrally attached to the vehicle frame. The linkage simulates the conventional steering geometry provided by a tie rod assembly. During execution of a turn, the inner wheel turns more than the outer wheel to minimize tire scrub or slippage on the road or other surface. The linkage maintains a controlled spatial relationship between the ends of the steering arms. In one form of the invention, pivotally connected rigid links tie the steering arms together. In another form of the invention, the steering arms are tied together by a flexible cable assembly.

The steering linkage of the invention is equally effective whether the vehicle wheels are extended or retracted. Mechanical adjustment of the linkage is not required upon extension or retraction of the wheels. The steering linkage is easy to install, adjust and service upon a vehicle. Steering loads are not necessarily transmitted through the system.

DESCRIPTION OF THE DRAWINGS

FIG. 1 is a diagrammatical top plan view of a vehicle frame with a steering mechanism according to the prior art;

DESCRIPTION OF PREFERRED EMBODIMENTS

Figure 2:
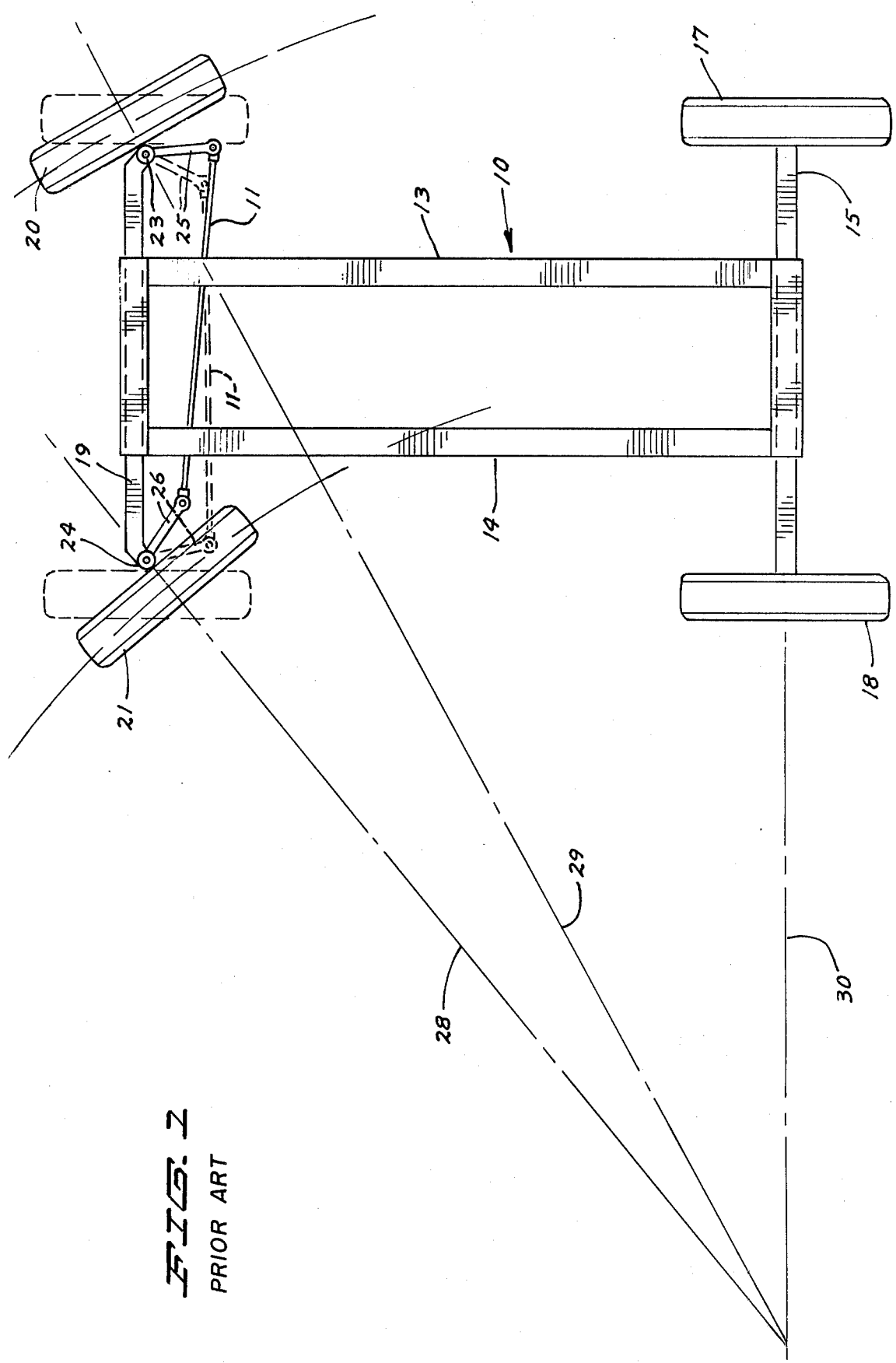
FIG. 2 is a diagrammatical top plan view of a vehicle frame equipped with a steering mechanism according to a first form of the invention.
Figure 2:
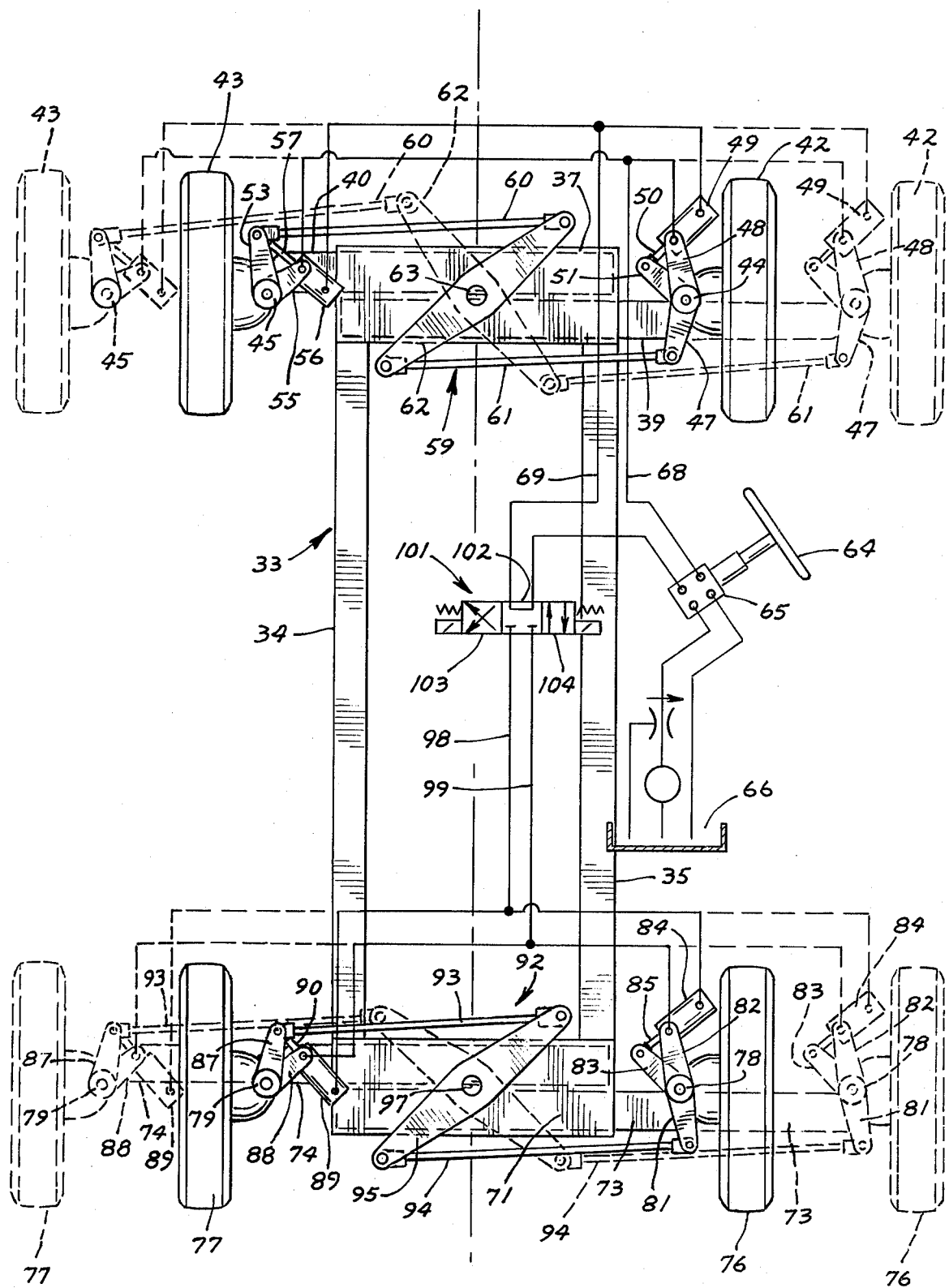

Referring to the drawings, FIG. 1 is illustrative of the prior art and shows a vehicle frame, indicated generally at 10, which has a steering geometry including a conventional tie rod 11 so as to produce so-called "toe-out" turns. Vehicle frame 10 has longitudinal side beams 13, 14 which carry a transverse rear axle 15. Non-steerable right and left rear wheels 17, 18 are rotatably mounted at the outer ends of rear axle 15.

The forward ends of side beams 13, 14 carry a front axle 19. Right and left front wheels 20, 21 are rotatably mounted with respect to front axle 19 for traveling rotation over a ground surface upon movement of vehicle frame 10. Right and left king pin assemblies 23, 24 pivotally mount front wheels 20, 21 for pivotal movement about upright axes, or axes perpendicular to the plane of FIG. 1, to permit steering of vehicle frame 10. A right steering arm 25 extends rearwardly from right hand king pin assembly 23 and is fixedly connected to right wheel 20 whereby rotation of the steering arm 25 effects rotation of the wheel 20 about the end of front axle 19. In similar fashion, a left steering arm 26 is fixedly assembled to the left front wheel 21 and extends rearward therefrom symmetrical to the right steering arm 15. Rotation of left hand steering arm 26 effects rotation of front left wheel 21. The rearward ends of the right and left steering arms 25, 26 are pivotally connected to respective ends of tie rod 11. In the straight-ahead configuration shown in phantom in FIG. 1, steering arms 25, 26 converge inward slightly toward the center line of vehicle frame 10 as they extend rearward from front axle 19. The straight ahead configuration, front axle 19, tie rod 11, and steering arms 25, 26 generally form a trapezoid with the tie rod 11 defining the shorter of the parallel sides thereof. Turning of the front wheels is accomplished by lateral or transverse movement of tie rod 11 by suitable, conventional steering gear (not shown).

In the execution of a turn, to eliminate tire slippage or scrub, the rolling axis of each turning wheel must substantially coincide with the radius of the arc about which the wheel is traveling. The steering geometry of FIG. 1 accomplishes this result by causing the inside wheel on the turn to pivot more than the outside wheel relative to the vehicle frame. As shown in solid lines in FIG. 1, the inside or left wheel 21 has a rolling axis indicated at 28 which is at a sharper angle relative to the center line of vehicle frame 10 than the rolling axis of the outside or right wheel 20, indicated generally at 29. The rolling axes 28, 29 of the front tires 20, 21 intersect at a point located approximately on an imaginary extension of the rolling axis of the rear wheels 17, 18, indicated at 30, which is the center of the arc about which vehicle frame 10 turns.

The relative geometry of the tie rod 11 and steering arms 25, 26 by design effects the desired increased pivotal movement of the inside turning tire during the turn. In execution of the left hand turn as illustrated in FIG. 1, tie rod 11 is moved from the straight-ahead orientation shown in phantom toward the right side of vehicle frame 10. This moves the ends of the steering arms 25, 26 to pivot the tires 20, 21. Tie rod 11 moves the end of right steering arm 25 to the right, thus pivoting the right front tire 20. The tie rod 11 moves the end of left steering arm 26 not only to the right but also along an arc extending forward whereby the left front tire 21 is pivoted more than the right front tire 20. Tie rod 11 maintains a fixed spatial relationship between the ends of the steering arms 25, 26 which results in their relative pivoting characteristic.

Referring to FIG. 2, there is shown a vehicle frame 33 equipped with a steering mechanism according to a first form of the invention. Vehicle frame 33 has a variable width track wherein the wheels are laterally extendible and retractable relative to vehicle 33. Extension of the track width enhances vehicle stability during the performance of work, while retraction of the track width improves vehicle maneuverability from a clearance standpoint. The steering mechanism of vehicle frame 33 incorporates a mechanical steering linkage which is extendible and retractable with the vehicle track and which serves a tie rod function in approximation of Ackermann steering geometry. Vehicle frame 33 can be a component of a rubber-tired truck crane, an earth working machine, or other such equipment.

Vehicle frame 33 includes longitudinal side beams 34, 35 which forwardly carry a box-like transverse end housing 37. End housing 37 telescopically houses right and left front wheel axles 39, 40. Responsive to suitable control means (not shown), front wheel axles 39, 40 are extendible and retractable relative to the housing 37. Right and left front wheels 42, 43 are rotatably mounted to the ends of the respective right and left front axles, and positioned to share a common rolling axis in the straight-ahead configuration shown. (The wheels can have a slight toe-in characteristic as is known in the art.) Right and left front king pin assemblies 44, 45 pivotally mount the front wheels 42, 43 to their respective axle ends for pivotal movement about generally upright axes, or axes perpendicular to the plane of FIG. 2, to permit steering of vehicle frame 33.

A right front steering arm 47 is rigidly connected to right front wheel 42 for rotation therewith about right king pin assembly 44. Steering arm 47 extends rearwardly and slightly inward toward the center line of vehicle frame 33. A right front bearing arm 48 is rigidly fixed relative to right front axle 39 and carries a pivotally connected right front power steering cylinder 49. A rod 50 is extendible and retractable relative to the cylinder 49 and is pivotally connected to a crank 51. Crank 51 is rigidly connected to right front wheel 42 for rotation therewith whereby extension and retraction of the rod 50 relative to the cylinder 49 effects turning of the right front wheel 42 and right front steering arm 47.

A left front steering arm 53 is rigidly connected to left front wheel 43 for rotation therewith about the left front king pin assembly 45. Steering arm 53 extends forwardly and slightly outward from the center line of vehicle frame 33. Left front steering arm 53 is positioned generally in supplementary relationship to an imaginery steering arm symmetrical to right front steering arm 47. Right and left steering arms 47, 53 in the straight-ahead configuration have symmetrical axes inwardly converging relative to the center line of vehicle frame 33. A left front bearing arm 55 is rigidly fixed relative to the left front axle 40 and carries a pivotally connected left front power steering cylinder 56. A rod 57 is extendible and retractable relative to cylinder 56 and is pivotally connected at its outer end to the end of left front steering arm 53. Extension and retraction of the rod 57 is effective to impart turning motion to the left front wheel 43.

A flexible front steering linkage 59 is intermediately connected to vehicle frame 33 and connects the outer ends of the front steering arms 47 and 53 to maintain a controlled spatial relationship between them during turning to achieve the desired steering geometry. Steering linkage 59 includes a first or left rigid steering rod 60, a second or right rigid steering rod 61, and a pivoted connecting link 62. Connecting link 62 is centrally, pivotally connected to a pivot 63 on vehicle frame 33. One end of left steering rod 60 is pivotally connected to the outer end of the left steering arm 53, while the other end is pivotally connected to one end of connecting link 62. In similar fashion, one end of the right steering rod 61 is pivotally connected to the outer end of the right steering arm 47. The opposite end of right steering rod 61 is pivotally connected to the other end of connecting link 62. Connecting link 62 rotates about pivot 63 to permit extension and retraction of linkage 59 along with front wheels 42, 43. Connecting link 62 also transmits force between the steering rods 60, 61 to enable the transmission of motion between the steering arms 47, 53. Steering linkage 59 maintains a controlled spatial relationship between the outer ends of steering arms 47, 53 during turning of the wheels such that there is substantially a fixed distance maintained between the end of right front steering arm 47 and the end of an imaginery steering arm positioned in supplementary relationship to left front steering arm 53. The steering arms 47 and 53 are relatively orientated such that the arm connected to the inside wheel on a turn experiences a greater degree of rotation than the other arm. Consequently, the inside wheel by design experiences a greater degree of turning than the outside wheel.

A steering control wheel 64 is operative to control turning of the front wheels 42, 43. Steering control wheel 64 is conventionally assembled to a hydraulic steering control valve 65 which derives hydraulic fluid under pressure from hydraulic fluid source 66. Upon operation of the steering control wheel 64, steering control valve 65 directs hydraulic fluid under pressure through one of suitable hydraulic lines 68, 69 to operate one of the power steering cylinders 49, 56 with a resultant turning of the wheels, as is known in the art. For example, in the execution of a right turn, responsive to turning control wheel 64, steering control valve 65 directs hydraulic fluid through the line 68 which results in a retraction of rod 50 relative to right power steering cylinder 49. Force applied to crank 51 results in turning of the right front wheel 42 toward the right. Right steering arm 47 pushes right steering rod 61 to rotate connecting link 62 clockwise as viewed in FIG. 2. Left steering rod 60 is pulled toward the right, rotating left steering arm 53 to turn the left front wheel 43 to the right. Right steering arm 47 is relatively orientated such that for a given rotational movement in a direction to turn the right front wheel 42 toward the right, the left steering arm 53 rotates a lesser amount resulting in less turning motion of the left front wheel 43. In corresponding fashion, the rotational travel of the end of left steering arm 53 during execution of a left turn is greater than that experienced by the end of right steering arm 47. The steering arms 47, 53 are so orientated such that, by design, the proportionate rotation of one as compared to the other during a turn acceptably approximates optimum steering geometry.

Upon outward extension of the front wheels 42, 43 as shown in phantom in FIG. 2, connecting link 62 rotates to permit corresponding extension of the steering rods 60, 61. In the extended orientation, shown in phantom, the steering linkage functions as described above to provide desired steering geometry.

As shown, vehicle frame 33 is equipped for steering control of the rear wheels as well as the front wheels. A box-like transverse end housing 71 is carried at the rearward end of longitudinal side beams 34, 35. End housing 71 telescopically houses right and left rear wheel axles 73, 74. Responsive to suitable control means (not shown), rear wheel axles 73, 74 are extendible and retractable relative to the rear end housing 71 and thus vehicle frame 33. Right and left rear wheels 76, 77 are rotatably mounted to the ends of the respective right and left rear axles 73, 74, positioned to share a common rolling axis in the straight-ahead configuration shown. Right and left rear king pin assemblies 78, 79 pivotally mount the rear wheels 76, 77 to their respective axle ends for pivotal movement about generally upright axes to permit steering.

The steering mechanism provided for steering the rear wheels is substantially the same as that described for steering the front wheels. A right rear steering arm 81 is fixed for rotation with right rear wheel 76 and extends rearward from king pin assembly 78 at an angle slightly outward from the center line of vehicle frame 33. A right rear bearing arm 82 is fixedly assembled to right rear axle 73. A crank 83 is located proximate the bearing arm 82 and is fixed for rotation with the right rear wheel 76. A right rear power steering cylinder 84 is pivotally attached to the right rear bearing arm 82 and has an extendible and retractable rod 85. The end of rod 85 is pivotally connected to crank 83 whereby extension and retraction of the rod 85 results in turning of the rear wheel 76.

On the left side of vehicle frame 33, a rear steering arm 87 is fixed for rotation with rear wheel 77 and extends forward from left rear king pin assembly 79 and slightly inward toward the center line of vehicle frame 33. A left rear bearing arm 88 is rigidly fixed relative to left rear axle 74 and carries a pivotally connected left rear power steering cylinder 89. A rod 90 is extendible and retractable relative to the cylinder 89 and is pivotally connected to the outer end of left rear steering arm 87. Extension and retraction of the rod 90 relative to the cylinder 89 is effective to turn the left rear wheel 77 about king pin assembly 79.

A flexible rear steering linkage 92 connects the outer ends of the rear steering arms 81, 87 to maintain a controlled spatial relationship between them during turning and achieve the desired steering geometry. Steering linkage 92 includes a first or left steering rod 93, a second or right steering rod 94, and a pivoted connecting link 95. Connecting link 95 is centrally, pivotally connected to pivot 97 on vehicle frame 33. One end of the left steering rod 93 is pivotally connected to the outer end of the left steering arm 87, while the other end is pivotally connected to one end of connecting link 95. In similar fashion, one end of right steering rod 94 is pivotally connected to the outer end of the right steering arm 81. The opposite end of right steering rod 94 is pivotally connected to the other end of connecting link 95. Connecting link 95 rotates about pivot 97 to extend and retract linkage 92 along with rear wheels 76, 77. Rear steering linkage 92 operates as previously described relative to the front steering linkage 59. As shown in phantom, rear steering linkage 92 is expandable upon extension of the rear axles 73, 74 relative to end housing 71 and still accomplishes steering according to the desired steering geometry.

Rear power steering cylinders 84, 89 receive hydraulic fluid through hydraulic lines 98, 99 which extend to a mode selector valve indicated schematically at 101, whereby turning of the rear wheels is controllable by steering control wheel 64. Mode selector valve 101 has an off position shown at 102, whereby hydraulic fluid is not directed through the hydraulic lines 98, 99 and the rear wheels are maintained in a locked and, as shown, straight-ahead configuration. In this configuration, vehicle frame 33 is conventionally steered through the front wheels only. Mode selector valve 101 has a second or four-wheel steering position indicated at 103 which permits normal four-wheel steering. In this second position, hydraulic fluid is directed to the power steering cylinders 84, 89 in such a fashion that the rear wheels 76, 77 turn in a direction opposite to that of the front wheels, thus to complement and assist in the turn. Mode selector valve 101 has a third or crab position indicated at 104 whereby hydraulic fluid is directed to the power steering cylinders 84, 89 to cause the rear wheels 76, 77 to turn in the same direction as the front wheels 42, 43. In such an orientation, vehicle frame 33 is able to crab or move linearly with its center line angularly disposed to the path of travel.

Figure 3:
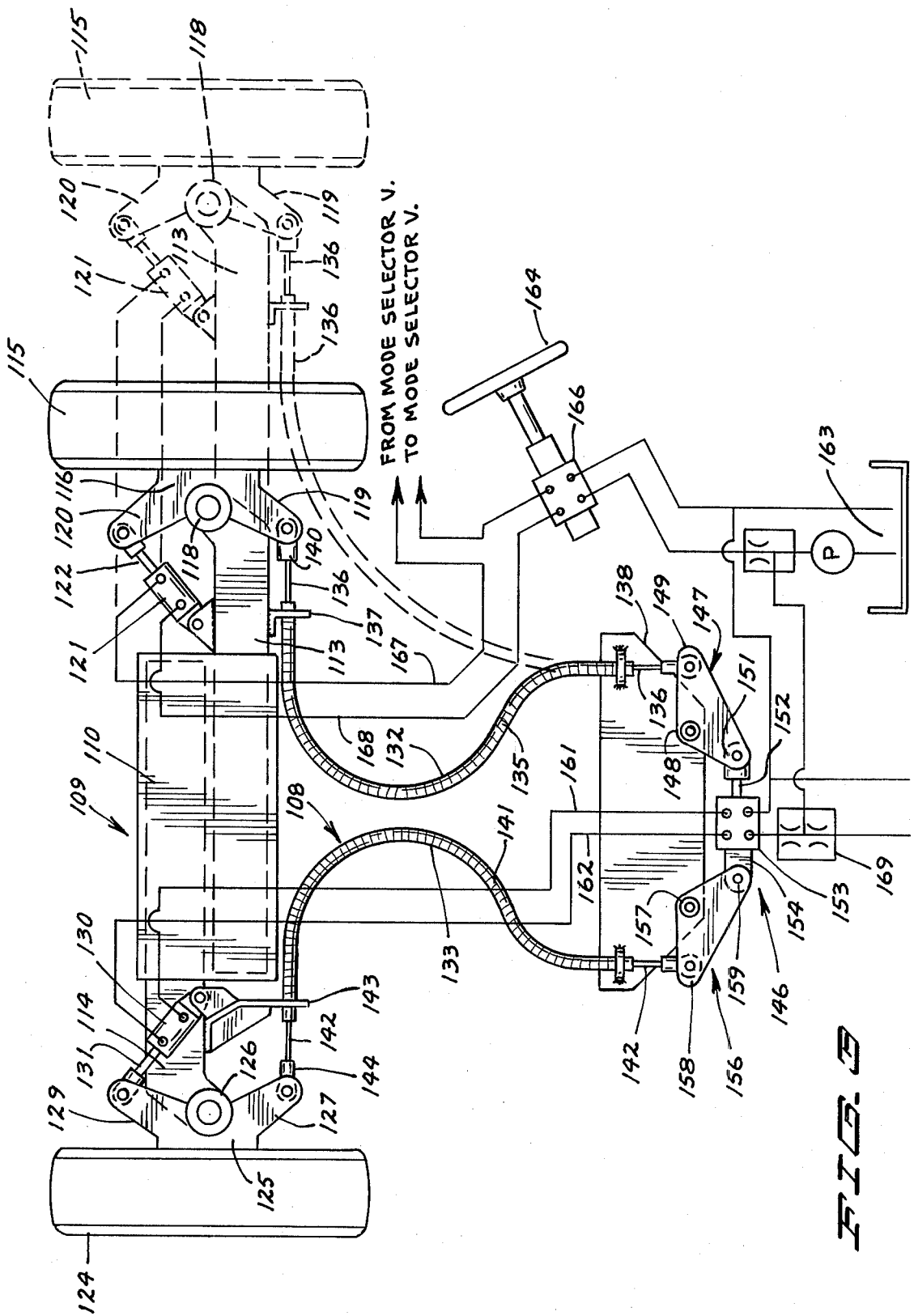
FIG. 3 is a diagrammatical top plan view of a portion of a vehicle frame equipped with a steering mechanism according to a second form of the invention.

Referring to FIG. 3, there is shown a steering mechanism according to a second form of the invention having a flexible steering linkage indicated generally at 108 installed on the front of a partially shown vehicle frame 109. Transverse, box-like end housing 110 telescopically houses extendible and retractable right and left axles 113, 114. Suitable power means (not shown) are provided for extension and retraction of the axles relative to the transverse housing 110.

A right front wheel 115 is rotatably assembled to a right wheel hub 116 for traveling rotation about a usually horizontal axis. A right king pin assembly 118 pivotally mounts right wheel hub 116 and right wheel 115 to the outer end of right axle 113 for turning motion about a generally upright axis or an axis perpendicular to the plane of FIG. 3.

Wheel hub 116 carries a rearwardly and slightly inwardly extended right steering arm 119. A right bearing arm 120 extends forward on wheel hub 116. A right power steering cylinder 121 is pivotally connected at one end to right axle 113 and has an extendible and retractable rod 122 pivotally connected to right bearing arm 120. Extension and retraction of the rod 122 relative to the power steering cylinder 121 is effective to impart turning motion to right front wheel 115.

A left front wheel 124 is rotatably assembled to a left wheel hub 125 for traveling rotation about a generally horizontal axis. A left king pin assembly 126 pivotally mounts the left front wheel 124 and wheel hub 125 for turning motion about a generally upright axis or an axis perpendicular to the plane of FIG. 3. Left wheel hub 125 carries a rearwardly and slightly inwardly extended left steering arm 127 symmetrical to right steering arm 119. A left bearing arm 129 extends forward on wheel hub 125. A left power steering cylinder 130 is pivotally connected to left axle 114 and has an extendible and retractable rod 131 pivotally connected to the left bearing arm 129. Extension and retraction of the rod 131 relative to the power steering cylinder 130 is effective to impart turning motion to the left front wheel 124.

Steering linkage 108 serves a tie rod function of maintaining a fixed spatial relationship between the outer ends of the steering arms 119, 127, thus to effect a greater amount of turn on the inner wheel during turning. Steering linkage 108 is furthermore flexible in order to follow the front wheels as they are extended and retracted relative to vehicle frame 109.

Steering linkage 108 includes a control cable assembly having first and second or right and left push-pull cable assemblies 132 and 133, respectively. Right push-pull cable assembly 132 includes a housing or jacket 135 and a cable 136 movably located therein and having ends extending out from either end thereof. One end of jacket 135 is fixed, as by the bracket 137, to the right axle 113. The other end of jacket 135 is fixed to a steering linkage plate 138 which is in turn fastened to vehicle frame 109 by suitable means (not shown). An end of cable 136 extends from the end of jacket 135 fastened to right axle 113 and is pivotally assembled by a suitable coupler 140 to the end of right steering arm 119 for movement therewith.

Left push-pull cable assembly 133 includes a housing or jacket 141 and a cable 142 movably located therein. One end of jacket 141 is fastened to a bracket 143 secured to the left axle 114. The corresponding end of cable 142 is pivotally connected as by a coupler 144 to the end of left steering arm 127 for movement therewith. The opposite end of jacket 141 is fastened to steering linkage plate 138 on the side opposite the end of jacket 135 of the right push-pull cable assembly.

The ends of cables 136, 142 opposite steering arms 119, 127 are operatively connected to a bell crank and valve assembly, indicated generally at 146, which provides simulation of the desired tie rod steering geometry. Through bell crank and valve assembly 146, the left wheel 124 follows or turns responsive to turning motion of the right wheel and in accord with the designed steering geometry. A right bell crank 147 is pivoted at its apex 148 to the right side of steering linkage plate 138, and has an outer arm 149 pivotally connected to the end of cable 136. The inner arm 151 of right bell crank 147 is pivotally connected to a rod or plunger 152 of a linkage type steering valve 153. Plunger 152 is retractable and extendible relative to a body or housing 154 of linkage valve 153.

A left bell crank 156 is pivoted at its apex 157 to the left side of steering linkage plate 138 and has an outer arm 158 pivotally connected to the end of cable 142. An inner arm 159 of bell crank 156 is pivotally connected to the body or housing 154 of linkage steering valve 153.

Linkage steering valve 153 has outlets connected to hydraulic lines 161, 162 extending to the left power steering cylinder 130 for delivery of hydraulic fluid to extend and retract rod 131. In a neutral position of valve 153, the inner arms 151, 159 of the bell cranks 147, 156, are a fixed distance apart, and the left front wheel 124 is held in a fixed position. Movement of one of the inner arms of the bell cranks relative to the other opens one or more outlets of valve 153 to initiate turning motion of left wheel 124 by delivery of hydraulic fluid from a source 163 through the valve 153 to the left power steering cylinder 130.

A steering control wheel 164 is connected through a steering control valve 166 to the right power steering cylinder 121 to control turning of right front wheel 115. Steering control valve 166 can be of a conventional variety, deriving hydraulic fluid from source 163. Responsive to turning of the control wheel 164, hydraulic fluid is delivered through one of the hydraulic fluid lines 167 or 168 to one side or the other of power steering cylinder 121 to selectively extend or retract rod 122 resulting in turning of front wheels 115.

The operation of steering linkage 108 can be described and understood with reference, for example, to execution of a right hand turn. Steering control wheel 164 is manipulated in conventional fashion, or turned to the right, whereby hydraulic fluid is delivered through the hydraulic fluid line 168 by steering control valve 166 with a resultant extension of the rod 122 from the power steering cylinder 121. Rod 122, bearing against bearing arm 120, pivots the right front wheel 115 in a clockwise direction as viewed in FIG. 3, turning the right front wheel 115 to the right. Right steering control arm 119 pushes the cable 136 of the right push-pull cable assembly 132, moving it relative to the jacket 135. Cable 136 rotates right bell crank 147, pushing plunger 152 of linkage steering valve 153 inwardly relative to the body or housing 154. Valve 153, with plunger 152 so displaced, admits hydraulic fluid through hydraulic fluid line 162 to retract rod 121 of power steering cylinder 130 resulting in turning of the left wheel 124 toward the right. Upon the turning of the left wheel, left steering arm 127 pulls cable 142 of left push-pull cable assembly 133. This rotates the left bell crank 156 in a direction to move the housing 154 outwardly of linkage steering valve 153 toward a neutral position with respect to the plunger 152.

As long as the right wheel is turning, the left wheel is forced to turn also to a degree governed by the geometry of the bell crank and valve assembly 146. When the turning motion of the steering control wheel 164 is terminated, the flow of hydraulic fluid is directed away from power steering cylinder 121 to return to source 163 by a spring centering spool (not shown) located in the steering control valve 166. Motion through the cable 136 from the right steering arm 119 to the right bell crank 147 is terminated. However, hydraulic fluid continues to be directed to the left power steering cylinder 130 until a neutral position is reached in linkage valve 153 by plunger 152 and body or housing 154. This occurs when the left wheel 124 reaches its proper rotational orientation relative to the right wheel 115 as sensed by the cable 142 and transmitted to left bell crank 156.

The reverse procedure occurs when returning to the straight-ahead orientation or when turning to the left. Right and left push-pull cable assemblies 132, 133 provide mechanical feedback of the position of the wheels to bell crank and valve assembly 146 whereby linkage valve 153 properly orientates the left wheel 124 relative to the right wheel 115. The steering geometry is achieved by the relative positioning of the apexes 148, 157 of right and left bell cranks 147, 156, and the position of the ends of the inner arms 151, 159 of the bell cranks. Linkage valve 153 serves a tie rod function, maintaining a fixed spatial relationship between the inner ends of the bell cranks or causing the left wheel 124 to turn in the proper direction a proper amount when the spatial relationship is upset by turning of the right wheel 115.

In the configuration of FIG. 3, the push-pull cable assemblies provide feedback to the bell crank and valve assembly as to the relative positioning of the wheels which are turned by the power steering cylinders. It may be seen that a manual steering system can be provided by substitution of the linkage steering valve 153 with a rigid link and providing cable assemblies of sufficient strength to transmit turning motion between the bell crank assembly and the wheels.

The right and left axles 113, 114 are individually extendible from the vehicle frame 109 to increase the track width. The right axle 113 is shown extended in phantom in FIG. 3. The right push-pull cable assembly 132 extends along with the axle and the steering geometry of the steering linkage is not affected. The inherent flexibility of the push-pull cable assemblies 132, 133 readily accommodates such extension and retraction. Other suitable cable assemblies could be substituted for the push-pull cable assemblies, for example, tension cable assemblies.

Vehicle frame 109 can be equipped for steering of the rear wheels as well as the front wheels. A flow divider 169 is operable to divert hydraulic fluid from source 163 to a rear steering linkage of the same construction as that shown. A mode selector valve, indicated taking off from hydraulic fluid line 167 in FIG. 3, is operable to select the steering mode as described relative to the form of the invention shown in FIG. 2.

Figure 4:
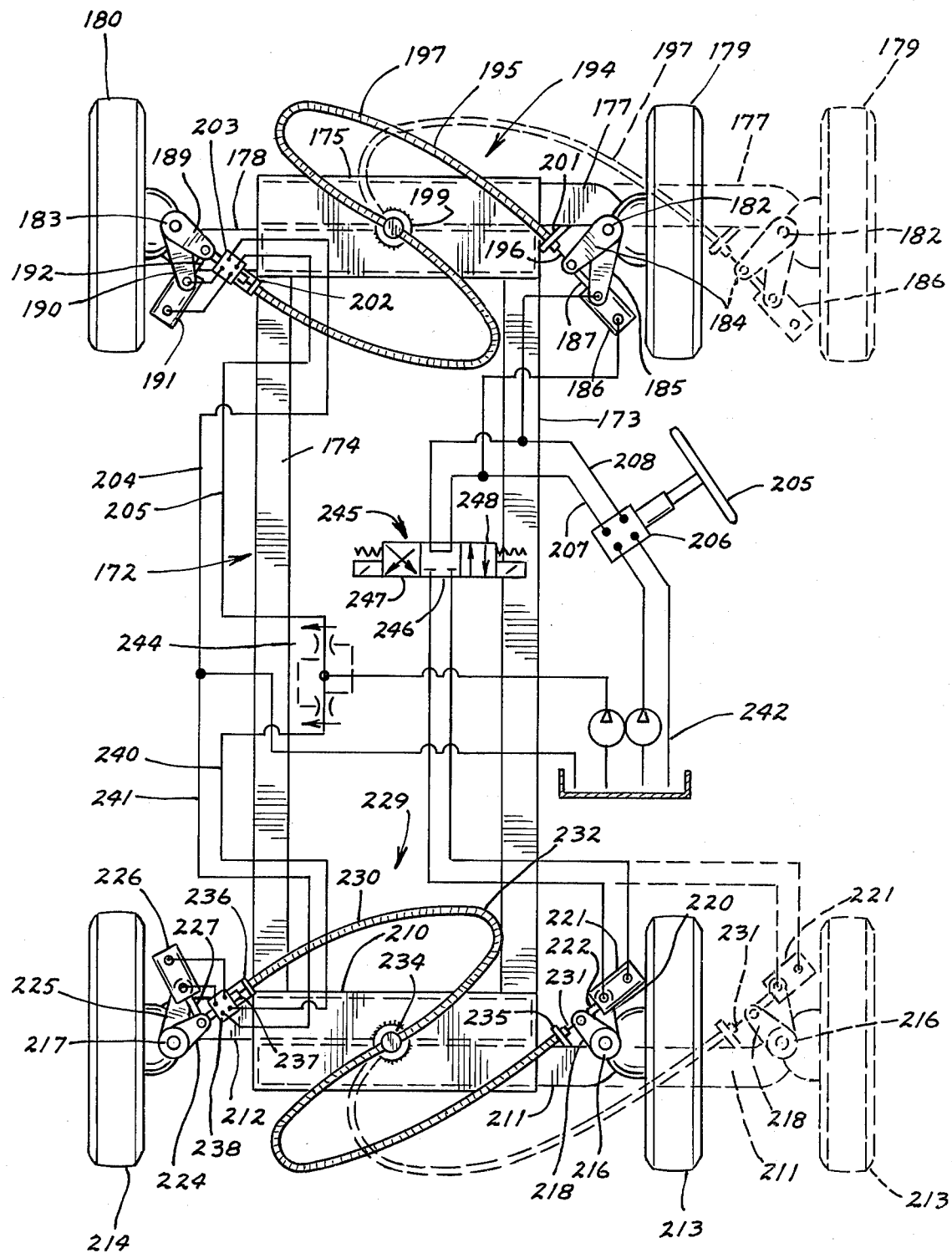
FIG. 4 is a diagrammatical top plan view of a vehicle frame equipped with a steering mechanism according to a third form of the invention.

Referring to FIG. 4, there is shown a variable track vehicle frame 172 equipped with a steering mechanism according to a third form of the invention. Vehicle frame 172 includes longitudinal side beams 173, 174 which carry a front box-like transverse end housing 175. Housing 175 telescopically houses right and left front wheel axles 177, 178. Responsive to suitable control means (not shown), front wheel axles 177, 178 are extendible and retractable relative to the forward end housing 175 to increase the track width of vehicle frame 172 for purposes of stability.

Right and left front wheels 179, 180 are mounted for traveling rotation to the ends of the respective right and left front axles 177, 178, positioned generally to share a common rolling axis in the straight-ahead configuration shown. Right and left front king pin assemblies 182, 183 pivotally mount the front wheels 179, 180 to their respective axle ends for pivotal movement about a generally upright axis, or axes perpendicular to the plane of FIG. 4, to permit steering of vehicle frame 172. A right front steering arm 184 is rigidly connected to right front wheel 179 for rotation therewith about right king pin assembly 182. Steering arm 184 extends centrally inward toward the center line of vehicle frame 172. A right front bearing arm 185 is rigidly fixed relative to the right front axle 177 and carries a pivotally connected right front power steering cylinder 186. A rod 187 is extendible and retractable relative to the power steering cylinder 186 and is pivotally connected to the end of right front steering arm 184. Extension and retraction of the rod 187 relative to the right front power steering cylinder 186 is effective to turn the right front wheel 179.

In similar fashion, a left front steering arm 189 is fixedly assembled to the left front wheel 180 for rotation about the left front king pin assembly 183 and extends centrally inward toward the center line of vehicle frame 172. A left front bearing arm 190 is fixed to the left front axle 178 and carries a pivotally connected left front power steering cylinder 191. A rod 192 is extendible and retractable relative to the power steering cylinder 191 and is pivotally connected at its end to the end of left front steering arm 189. Extension and retraction of the rod 192 relative to the power steering cylinder 191 is effective to turn the left front wheel 180.

A flexible steering linkage, indicated generally at 194, unites the ends of the steering arms 184, 189 to maintain a fixed spatial relationship between them and achieve the desired steering geometry. Steering linkage 194 includes a push-pull cable assembly 195 having a cable 196 movably located in a housing or jacket 197. Push-pull cable assembly 195 extends from one lateral side of vehicle frame 172 to the other and is centrally, pivotally connected to vehicle frame 172 by a gimbal assembly 199 fastened to forward transverse housing 175. One end of jacket 197 adjacent the front right steering arm 184 is fixed to the right front axle 177 by a suitable bracket 201. The corresponding end of the cable 196 is pivotally connected to the end of the right front steering arm 184 for movement therewith. The opposite end of jacket 197 of push-pull cable assembly 195 is fixed to the left front axle 178 by another bracket 202. The corresponding end of the cable 196 extends to the spool control of a linearly operable follow-up linkage-type steering valve 203. The body of linkage-type steering valve 203 is pivotally connected to the end of the left front steering arm 189. Linkage-type steering valve 203 derives hydraulic fluid through hydraulic lines 204, 205 and is hydraulically connected to the left front power steering cylinder 191. Linear motion of the spool of follow-up valve 203, as occasioned by movement of the cable 196, is operative to direct hydraulic fluid to the left front power steering cylinder 191 and extend or retract the rod 192 a corresponding amount, thus to turn the left front wheel 180.

A conventional steering control wheel 205 operates through a steering control valve 206 to control turning of the right front wheel 179. Manipulation of the steering control wheel 205 in the conventional fashion delivers hydraulic fluid via the steering control valve 206 through one or the other of hydraulic lines 207, 208 to the right front power steering cylinder 186 to turn the right front wheel 179. The right front steering arm 184 follows the turn, and the cable 196 follows the end of the steering control arm. The opposite end of the cable 196 linearly moves the spool of linkage-type steering valve 203 to admit fluid to the left front power steering cylinder 191. This causes movement of the rod 192 against the end of the left front steering arm 189 which results in a turning of the left front wheel 180 a desired amount according to the designed steering geometry. Left front wheel 180 turns until linkage-type steering valve 203 reaches a neutral position. This occurs when the proper spatial relationship is reached between the ends of the steering arms 184, 189.

Vehicle frame 172 can be equipped for steering of the rear wheels as shown in FIG. 4. Side beams 173, 174 carry a rear, transverse end housing 210 which telescopically houses extendible and retractable right and left rear axles 211, 212. Right and left rear wheels 213, 214 are rotatably mounted to the ends of the respective right and left rear axles 211, 212, positioned generally to share a common rolling axis in the straight-ahead configuration shown. Right and left rear king pin assemblies 216, 217 pivotally mount the rear wheels to their respective axle ends for pivotal movement about a generally upright axis. A right rear steering arm 218 is rigidly connected to the right rear wheel 213 for rotation therewith about the right rear king pin assembly 216. A right rear bearing arm 220 is rigidly fixed relative to the right rear axle 211 and carries a pivotally connected right rear power steering cylinder 221. A rod 222 is extendible and retractable relative to the power steering cylinder 221 and is pivotally connected to the end of the right rear steering arm 218. Extension and retraction of the rod 223 relative to the right rear power steering cylinder 221 is effective to turn the right rear wheel 213.

In similar fashion, a left rear steering arm 224 is fixedly assembled to the left rear wheel 214 for rotation about the left rear king pin assembly 217. Right and left rear steering arms 218, 224 both extend forwardly from the rear axles and incline slightly inward toward the center line of vehicle frame 172. A left rear bearing arm 225 is fixed to the left rear axle 214 and carries a pivotally connected left rear power steering cylinder 226. A rod 227 is extendible and retractable relative to the power steering cylinder 226 and is pivotally connected at its end to the end of left rear steering arm 224. Extension and retraction of the rod 227 relative to the power steering cylinder 226 is effective to turn the left rear wheel 214.

A flexible steering linkage, indicated generally at 229, unites the outer ends of the steering arms 218, 224 to maintain a fixed spatial relationship between them and achieve the desired steering geometry. Steering linkage 229 includes a push-pull cable assembly 230 having a cable 231 movably located in a housing or jacket 232. Push-pull cable assembly 230 extends from one lateral side of vehicle frame 172 to the other and is centrally, pivotally connected to vehicle frame 172 by a gimbal assembly 234 fastened to vehicle frame 172. One end of jacket 232 is fastened by a suitable bracket 235 to the right rear axle 211 adjacent the right rear steering arm 218. The corresponding end of the cable 231 is pivotally connected to the end of the right rear steering arm 218 for movement therewith. The opposite end of jacket 232 is fixed to the left rear axle 212 by a second bracket 236. The corresponding end of the cable 231 extends to the spool control 237 of a linearly operable linkage-type steering valve 238. Linkage-type steering valve 238 is pivotally connected to the end of the left rear steering arm 224 and is hydraulically connected to left rear power steering cylinder 226 for control thereof.

The functioning of the rear steering mechanism is the same as that described relative to the front steering mechanism. Hydraulic fluid is supplied to the rear linkage-type steering valve 238 through hydraulic lines 240, 241 to operate the left rear power steering cylinder 226. Hydraulic fluid is supplied to the steering control valve 206 as well as the linkage-type steering valves 203, 238 from a suitable hydraulic fluid source 242. A flow divider 244 is operable to divide the hydraulic fluid flow between the front linkage-type steering valve 203 and the rear linkage-type steering valve 238. A mode selector valve 245 is operable to connect the hydraulic lines 207, 208, which control the right front power steering cylinder 186, to the right rear power steering cylinder 221. Mode selector 245 functions as previously described relative to the mode selector valve 101 of the form of the invention shown in FIG. 1. Mode selector valve 245 has an off position 246, a four-wheel normal steering position 247, and a crab position 248.

The front and rear flexible steering linkages 194, 229 are operable to extend and retract along with the wheels of the vehicle but still provide the desired steering geometry. As shown in phantom in FIG. 4, the inherent flexibility of the push-pull cable assemblies enables the linkages to extend outwardly with the front and rear right wheels 179, 213.

While there have been shown and described with particularity three forms of the invention, it will be apparent to those skilled in the art that the invention can take on various other forms without departing from the scope and spirit of the invention.

The embodiments of the invention in which an exclusive property or privilege is claimed are defined as follows:

1. A steering mechanism for a vehicle of the type wherein at least one pair of steerable wheels is laterally extendible and retractable relative to the center line of the vehicle frame, each steerable wheel having a steering arm rotatable with the wheel and extendible and retractable with the wheel for steering rotation of the wheel, said steering mechanism including:
   an extendible and retractable steering linkage including flexible cable means;
   means connecting a first end of said steering linkage cable means to a first steering arm associated with a first of a pair of steerable wheels for extension and retraction with such wheel,
   means connecting the second end of said steering linkage cable means to a second steering arm associated with the second of said pair of steerable wheels for extension and retraction with such wheel;
   means intermediately connecting said linkage to said vehicle frame to maintain controlled spacial relationship between the outer ends of the steering arms whereby in the execution of a turn, the inside of said pair of steerable wheels turns at a sharper angle relative to the center line of said vehicle frame than the outside wheel of said pair of steerable wheels.

2. A steering mechanism for a vehicle of the type wherein at least one pair of steerable wheels is laterally extendible and retractable relative to the center line of the vehicle frame, each steerable wheel having a steering arm rotatable with the wheel for steering rotation of the wheel, said steering mechanism including:
   a flexible, extendible and retractable steering linkage;
   said flexible steering linkage including a flexible push-pull cable assembly;
   means connecting a first end of said steering linkage to a first steering arm associated with a first of a pair of steerable wheels;
   means connecting the second end of said steering linkage to a second steering arm associated with the second of said pair of steerable wheels;
   means intermediately connecting said linkage to said vehicle frame to maintain controlled spatial relationship between the outer ends of the steering arms whereby in the execution of a turn, the inside of said pair of steerable wheels turns at a sharper angle relative to the center line of said vehicle frame than the outside wheel of said pair of steerable wheels.

3. The steering mechanism of claim 2 including:
   a first flexible push-pull cable assembly extendible and retractable with said first wheel and having a jacket fixedly assembled to said vehicle frame and a first cable movably located therein, said first cable having one end connected to said first steering arm;
   a second, flexible push-pull cable assembly extendible and retractable with said second wheel and having a jacket fixedly assembled to said vehicle frame and a second cable movably located therein, said second cable having one end connected to said second steering arm;

bell crank and valve means secured to the vehicle frame for simulation of tie rod steering geometry;

the opposite ends of said first and second cables being connected to the bell crank and valve means whereby one of said pair of steerable wheels is caused to turn responsive to turning motion of the other steerable wheel.

4. The steering mechanism of claim 3 including: a power steering cylinder mounted with respect to said second steerable wheel for turning of the second steerable wheel, said bell crank and valve means including a first bell crank pivotally assembled relative to said vehicle frame and having a first arm connected to said first cable, a linkage valve, said first bell crank having a second arm connected to the linkage valve, said linkage valve operably connected to said power steering cylinder, a second bell crank pivotally assembled relative to said frame and having a first arm connected to said second cable, said second bell crank having a second arm connected to said linkage valve, said first bell crank arms and said second bell crank arms relatively positioned such that turning of the first steerable wheel turns the first bell crank through the first push-pull cable assembly to operate said linkage valve to actuate said power steering cylinder to turn said second wheel, the turning motion of said second wheel turning said second bell crank through said second push-pull cable assembly to neutralize said linkage valve when the proper orientation of the second wheel relative to the first wheel is reached.

5. The steering mechanism of claim 4 including: another power steering cylinder associated with the first wheel to turn the first wheel responsive to operation of a steering control means.

6. The steering mechanism of claim 2 wherein:

said push-pull cable assembly is extendible and retractable, having a jacket and a cable movably located therein, a first end of said cable attached to the first steering arm, a first end of said jacket fixed for extension and retraction with said first wheel, a second end of said jacket fixed for extension and retraction with said second wheel, a portion of said jacket being secured to the vehicle frame, power means associated with said second wheel operative to effect turning of the second wheel, a second end of said cable opposite the first end being connected to the power means to actuate the power means to turn the second wheel responsive to turning motion of the first wheel.

7. The steering mechanism of claim 6 wherein: said first and second steering arms are symmetrical and extend centrally inward when said wheels are orientated in a straight-ahead configuration, said push-pull cable assembly maintaining a fixed spatial relationship between the outer ends of said steering arms.

8. The steering mechanism of claim 6 wherein: said power means includes a power steering cylinder fixed to effect turning motion of said second wheel, and a linkage-type steering valve operably connected to said power steering cylinder, said second end of the cable being connected to the linkage-type steering valve to actuate the linkage-type steering valve and turn the second wheel responsive to turning motion of said first wheel.

9. The steering mechanism of claim 8 wherein: said first and second steering arms are symmetrical and extend centrally inward when said wheels are orientated in a straight-ahead configuration, said push-pull cable assembly maintaining a fixed spatial relationship between the outer ends of said steering arms.

10. The steering mechanism of claim 2 wherein said steerable pair of wheels are front wheels, said vehicle being of the type also having a rear pair of steerable wheels at least one of which is laterally extendible and retractable relative to the center line of the vehicle frame, each of said rear pair of steerable wheels having a steering arm rotatable with the wheel for steering rotation of the wheel, including:

a second flexible, extendible and retractable steering linkage;

means connecting a first end of said second steering linkage to a first steering arm associated with a first of said rear pair of steerable wheels;

means connecting the second end of said second steering linkage to a second steering arm associated with the second of said rear pair of steerable wheels;

means intermediately connecting said second linkage to said vehicle frame to maintain controlled spatial relationship between the outer ends of the steering arms of the pair of rear wheels whereby in execution of a turn, the inside of said pair of rear steerable wheels turns at a sharper angle relative to the center line of said vehicle frame than the outside wheel of said rear pair of steerable wheels; and means selectively, operatively associating said front pair of wheels and rear pair of wheels for corresponding turning of the rear pair of wheels upon turning of the front pair of wheels.

11. The steering mechanism of claim 10 wherein: said means operatively associating the front pair of wheels and the rear pair of wheels includes a mode selector valve selectively operable between a first mode to restrain turning movement of the rear pair of wheels, a second mode to cause turning movement of the rear pair to wheels in the same direction and in generally corresponding amount to turning movement of the front pair of wheels to permit crabbing of the vehicle, and a third mode to turn the rear pair of wheels in opposite direction of the turning of the front pair of wheels whereby the rear wheels assist in the turn.

12. A steering mechanism for a vehicle of the type wherein at least one of a pair of steerable wheels is laterally extendible and retractable relative to the center line of the vehicle frame, each steerable wheel having a steering arm rotatable with the wheel for steering rotation of the wheel, said steering mechanism including:

a flexible, extendible and retractable steering linkage;

means connecting a first end of said steering linkage to a first steering arm associated with a first of a pair of steerable wheels;

means connecting the second end of said steering linkage to a second steering arm associated with the second of said pair of steerable wheels;

means intermediately connecting said linkage to said vehicle frame to maintain controlled spatial relationship between the outer ends of the steering arms whereby in the execution of a turn, the inside of said pair of steerable wheels turns at a sharper angle relative to the center line of said vehicle frame than the outside wheel of said pair of steerable wheels;

said first and second steering arms orientated to converge centrally inward relative to the vehicle frame when said wheels are orientated in a straight-ahead configuration, a power steering cylinder associated with said second wheel to effect turning of the second wheel, said steering linkage including push-pull cable means operatively connected between the ends of said steering arms to maintain fixed spatial relationship between the ends of said steering arms, and valve means connected to the push-pull cable means and controllably connected to the power steering cylinder whereby turning movement of the first wheel operates the valve means through the push-pull cable means to control the power steering cylinder to cause corresponding turning of the second wheel.

13. The steering mechanism of claim 12 wherein said steerable pair of wheels are front wheels, said vehicle being of the type also having a rear pair of steerable wheels at least one of which is laterally extendible and retractable relative to the center line of the vehicle, each of said rear pair of steerable wheels having a steering arm rotatable with the wheel for steering rotation of the wheel, including:
a second flexible, extendible and retractable steering linkage;
means connecting a first end of said second steering linkage to a first steering arm associated with a first of said rear pair of steerable wheels;
means connecting the second end of said second steering linkage to a second steering arm associated with the second of said rear pair of steerable wheels;
means intermediately connecting said second linkage to said vehicle frame to maintain controlled spatial relationship between the outer ends of the steering arms of the pair of rear wheels whereby in execution of a turn, the inside of said pair of rear steerable wheels turns at a sharper angle relative to the center line of said vehicle frame than the outside wheel of said rear pair of steerable wheels; and
means selectively, operatively associating said front pair of wheels and rear pair of wheels for corresponding turning of the rear pair of wheels upon turning of the front pair of wheels.

14. The steering mechanism of claim 13 wherein: said first and second steering arms of the rear pair of wheels are orientated to converge centrally inward with respect to said vehicle center line when said wheels are orientated in a straight-ahead orientation, a second power steering cylinder associated with said second wheel of the rear pair of wheels to effect turning of said second wheel, said second steering linkage including a second push-pull cable means operatively connected between the ends of said steering arms of the rear pair of wheels to maintain fixed spatial relationship between said ends of the steering arms, and second valve means connected to the second push-pull cable means and controllably connected to the second power steering cylinder whereby turning movement of the first wheel of the rear pair of wheels operates the second valve means through the second push-pull cable means to control the second power cylinder to cause corresponding turning of the second wheel of said rear pair of wheels.

15. The steering mechanism of claim 14 wherein: said means operatively associating the front pair of wheels and the rear pair of wheels includes a mode selector valve selectively operable between a first mode to restrain turning movement of the rear pair of wheels, a second mode to cause turning movement of the rear pair of wheels in the same direction and in generally corresponding amount to turning movement of the front pair of wheels to permit crabbing of the vehicle frame, and a third mode to turn the rear pair of wheels in opposite direction of the turning of the front wheels whereby the rear wheels assist in the turn.

16. The steering mechanism of claim 15 including: a third power steering cylinder operatively associated with the first wheel of said front pair of wheels for turning of said wheel, a fourth power steering cylinder operatively associated with the first wheel of said rear pair of wheels for turning said wheel, steering control means operatively connected to said third power steering cylinder and to said mode selector valve, said mode selector valve being connected to said fourth power steering cylinder.

17. A steering mechanism to simulate tie rod steering geometry for a vehicle of the type wherein at least one of a pair of steerable wheels is laterally extendible and retractable to the center line of the vehicle frame, each steerable wheel having a steering arm rotatable with the wheel for steering rotation of the wheel, said steering mechanism including:
a first cable assembly having one end pivotally connected to the end of a first steering arm of a first of said pair of steerable wheels and extendible and retractable therewith;
a second cable assembly having one end pivotally connected to the end of the second steering arm of the second of said pair of steerable wheels and extendible and retractable therewith;
bell crank means secured to the vehicle frame for simulation of tie rod steering geometry; and
the opposite ends of said first and second cable assemblies being connected to the bell crank means whereby one of said pair of steerable wheels is caused to turn responsive to turning motion of the other steerable wheel in simulation of tie rod steering geometry.

18. The steering mechanism of claim 17 wherein:
said bell crank means comprises a bell crank assembly having a first bell crank and first pivot means pivotally connecting the first bell crank to the vehicle frame, a second bell crank and second pivot means spaced from the first pivot means pivotally connecting the second bell crank to the vehicle frame;
said first bell crank having a first arm and a second arm extending from the first pivot means, said first arm being connected to the opposite end of the first cable assembly;
said second bell crank means having a first arm and a second arm extending from the second pivot means, said first arm being connected to the opposite end of the second cable assembly;
the outer ends of said second arms being connected by linkage means tending to orientate the outer ends of the second arms in fixed spatial relationship; and
the outer ends of said second arms and said first and second pivot means being relatively spaced and located to provide simulated tie rod steering geometry so that simulated tie rod steering geometry is provided to the first and second wheels through the first and second control cable assemblies.

19. The steering mechanism of claim 18 including: a power steering cylinder mounted with respect to the second steerable wheel for turning the second steerable wheel, said linkage means connecting the second arms of the first and second bell cranks including a linkage valve, said linkage valve operably connected to said power steering cylinder such that turning of the first steerable wheel turns the first bell crank through the first cable assembly to operate said linkage valve to operate said power steering cylinder to turn said second wheel, the turning motion of said second wheel turning said second bell crank through said second cable assembly to neutralize said linkage valve when the proper orientation of the second wheel relative to the first wheel is reached.

20. The steering mechanism of claim 19 including: another power steering cylinder associated with the first wheel to turn the first wheel responsive to operation of a steering control means.

21. The steering mechanism of claim 19 wherein: said first cable assembly and said second cable assembly are constituted as push-pull cable assemblies.

* * * * *